Aug. 3, 1954

D. T. McDONALD ET AL 2,685,493

INTERMITTENT CHART RECORDING INSTRUMENT

Filed April 18, 1952

Inventor
Louis Hickman
By Daniel T McDonald

Ralph Hanna, Attorney

Patented Aug. 3, 1954

2,685,493

UNITED STATES PATENT OFFICE 2,685,493

INTERMITTENT CHART RECORDING INSTRUMENT

Daniel T. McDonald, Bethesda, Md., and Louis Hickman, Dallas, Tex.; said Hickman assignor to American Meter Company, Incorporated, Erie, Pa., a corporation of Delaware, and said McDonald assignor to Magnolia Petroleum Company, Dallas, Tex., a corporation of Texas Application April 18, 1952, Serial No. 283,078

7 Claims. (Cl. 346—124)

In instruments for recording flow and the like, it has been customary to use a circular chart making one revolution in 24 hours, so that the integrated area of the instantaneous values of the quantity being measured throughout the 24 hour period will correspond to the total flow. However, when the flow is intermittent and not continuous, the ordinary continuous measuring instrument with the continuously rotating chart only shows a series of peaks with no area which can be integrated with a reasonable degree of accuracy. This invention is intended to overcome the difficulties of recording intermittent flow with a continuous instrument by having a high speed chart e. g. a chart making one revolution in an hour and stopping the chart whenever the flow drops to some low value or a value which is negligible compared to the full scale value of the chart. With this arrangement, a one hour chart can contain the information of from 12 to 24 hours actual elapsed time and the area under the instantaneous values indicated on the chart will be capable of integration. Further objects and advantages appear in the specification and claims.

Figure 1:
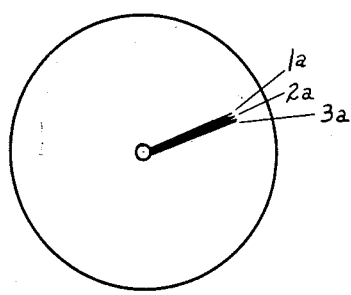
Figure 2:
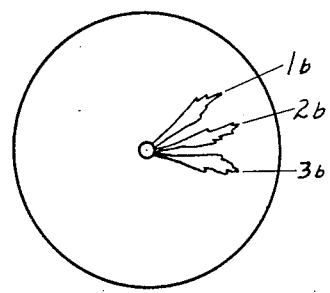
Figure 3:
Figure 4:
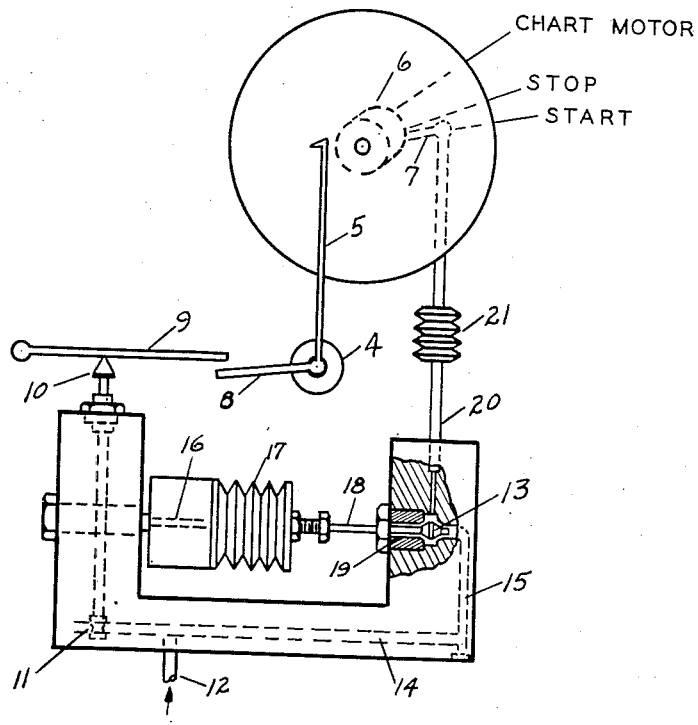

In the drawing, Fig. 1 shows the results obtained from measuring intermittent flow by a continuous indicating instrument with the standard 24 hour chart, Fig. 2 shows the results obtained with a one hour chart which operates only when the flow exceeds a negligible value, Fig. 3 is a diagram of the flow recorded on the charts shown in Figs. 1 and 2 and Fig. 4 is a diagrammatic view of the instrument for producing the chart indication of Fig. 2 from the intermittent flow as shown in Fig. 3.

When the conventional continuous chart recording instrument is applied to flow conditions, such as indicated diagrammatically in Fig. 3, where there are intermittent periods of flow indicated by reference numerals 1, 2, 3, there appears on the chart only peaks 1a, 2a, 3a which are so narrow as to have no sensible area under the peaks capable of integration. If, however, the chart operates at a relatively high speed and is stopped during the intervals when there is no flow, there is obtained the chart indicated in Fig. 2 where there are peaks 1b, 2b and 3b which have sufficient area so as to be capable of integration to indicate the total quantity of flow.

The recording instrument for producing the chart shown in Fig. 2 from the flow conditions indicated in Fig. 3 is shown diagrammatically in Fig. 4 where the measuring instrument 4 has a pen arm 5 co-operating with a chart driven by a high speed chart motor 6 having a lever 7 movable between start and stop positions. The pen arm is shown in the start position, where the chart motor is running. When the flow drops to a slightly lower value a lever 8 fixed to the pen arm engages a flapper 9 and moves it away from a nozzle 10. The nozzle is fed through a restriction 11 from a source of pneumatic pressure 12 which also feeds a valve 13 through lines 14 and 15. In the position illustrated, the flapper 9 is closest to the nozzle and the nozzle pressure is accordingly at a maximum. The nozzle pressure is fed through a way 16 to a bellows 17 having a stem 18 attached to the valve 13. Under maximum pressure conditions the valve 13 is biased to the right sealing channel 15 and opening the bleeder passage 19 which surrounds the stem 18. This results in a minimum pressure in a line 20 leading to a bellows 21 attached to the stop and start lever 7 on the chart motor. When the lever 8 engages the flapper 9 and lifts it away from the nozzle 10, the nozzle pressure immediately drops and causes the collapsing of the bellows 17 and the moving of the valve 13 to the left thereby sealing the bleeder passage 19. This results in an abrupt increase in pressure in the line 20 which expands the bellows 21 and moves the lever 19 from the start to the stop position. As soon as the flapper 9 returns to the position illustrated, there is an abrupt increase in the nozzle pressure which moves the valve 13 to the right and causes sufficient drop in pressure in the line 20 to collapse bellows 21 and thereby move the lever 7 to the start position. From a broad aspect, the chart is operated only when the information to be recorded on the chart requires integration. To achieve this, the chart is run at sufficiently high speed so that the intermittent flow can have integrable width on the chart and the chart is stopped whenever there is either no flow or a negligible flow. The means for stopping the chart when the flow has negligible value are well understood in the art. The specific means illustrated is diagrammatic.

One use of the instrument is in the recording of gas flow for oil well recovery where gas is pumped into the well for from 15-45 seconds at intervals of from 2-10 minutes, these time intervals being illustrative of intermittent flow conditions which do not produce an integrable area with a conventional continuous chart.

What is claimed as new is:

1. In a recorder having motor means for moving a chart, a sensitive element responsive to the instantaneous value of a quantity to be recorded, and a pen arm actuated by said sensitive element, means for starting said motor means when said quantity exceeds a minimum value and for stopping said motor means when said quantity is less than said minimum value comprising in combination stop and start means for said motor means, a first bellows for actuating said stop and start means, means for supplying a fluid under pressure to said first bellows, valve means for controlling the pressure of said fluid to said first bellows, a second bellows for actuating said valve means, means for supplying a fluid under pressure to said second bellows, valve means for controlling the pressure of said fluid to said second bellows, and means connected with said pen arm for actuating said last named valve means when said pen arm passes through a position represented by a minimum value of said quantity to be recorded.

2. In a recorder having motor means for moving a chart, a sensitive element responsive to the instantaneous value of a quantity to be recorded, and a pen arm actuated by said sensitive element, means for starting said motor means when said quantity exceeds a minimum value and for stopping said motor means when said quantity is less than said minimum value comprising in combination stop and start means for said motor means, a first bellows for actuating said stop and start means, a valve, means providing a conduit connecting said valve and said first bellows, a second bellows for actuating said valve, a nozzle, means providing a conduit connecting said nozzle and said second bellows, common means for supplying a fluid under pressure to said valve, said second bellows, and said nozzle, a flapper adapted to close said nozzle, and means connecting said flapper with said pen arm for actuating said flapper when said pen arm passes through a position represented by a minimum value of said quantity to be recorded.

3. In a recorder having motor means for moving a chart, a sensitive element responsive to the instantaneous value of a quantity to be recorded, and a pen arm actuated by said sensitive element, means for starting said motor means when said quantity exceeds a minimum value and for stopping said motor means when said quantity is less than said minimum value comprising in combination stop and start means for said motor means, a first bellows for actuating said stop and start means, a valve, means providing a conduit connecting said valve and said first bellows, a second bellows for actuating said valve, a nozzle, means providing a conduit connecting said valve, said second bellows, and said nozzle, a flapper adapted to close said nozzle, and means connecting said flapper with said pen arm for actuating said flapper when said pen arm passes through a position represented by a minimum value of said quantity to be recorded.

4. In a recorder having motor means for moving a chart, a sensitive element responsive to the instantaneous value of a quantity to be recorded, and a pen arm actuated by said sensitive element, means for starting said motor means when said quantity exceeds a minimum value and for stopping said motor means when said quantity is less than said minimum value comprising in combination stop and start means for said motor means, a first bellows for actuating said stop and start means, a valve, means providing a conduit connecting said valve and said first bellows, means providing a bleeder passage in said valve, means providing a conduit for supplying a fluid under pressure to said valve, a second bellows for actuating said valve whereby at one position of said valve said conduit for supplying a fluid under pressure to said valve is connected with said bleeder passage and at a second position of said valve said conduit for supplying a fluid under pressure to said valve is connected with said conduit connecting said valve and said first bellows, means for supplying a fluid under pressure to said second bellows, a valve means for controlling the pressure of said fluid to said second bellows, and means connected with said pen arm for actuating said valve means when said pen arm passes through a position represented by a minimum value of said quantity to be recorded.

5. In a recorder having motor means for moving a chart, a sensitive element responsive to the instantaneous value of a quantity to be recorded, and a pen arm actuated by said sensitive element, means for starting said motor means when said quantity exceeds a minimum value and for stopping said motor means when said quantity is less than said minimum value comprising in combination stop and start means for said motor means, a first bellows for actuating said start and stop means, means providing a conduit leading to said first bellows, a valve open in a first position to a bleeder passage and open in a second position to said conduit leading to said first bellows, a second bellows for actuating said valve to its first and second positions, a nozzle, means providing a conduit for supplying a common fluid pressure to said valve, said second bellows, and said nozzle, a flapper adapted to close said nozzle, and means connecting said flapper with said pen arm for actuating said flapper when said pen arm passes through a position represented by a minimum value of said quantity to be recorded.

6. In a recorder having motor means for moving a chart, a sensitive element responsive to the instantaneous value of a quantity to be recorded, and a pen arm actuated by said sensitive element, means for starting said motor means when said quantity exceeds a minimum value and for stopping said motor means when said quantity is less than said minimum value comprising in combination stop and start means for said motor means, a bellows for actuating said stop and start means, a pressure supply, conduit means leading from the pressure supply to the bellows, a fluid pressure actuated valve in said conduit means controlling the magnitude of the pressure supplied to the bellows, a control for the fluid pressure for actuating the valve comprising a nozzle, a restricted passageway leading from the pressure supply to the nozzle, a flapper adapted to close said nozzle and thereby cause the valve actuating pressure to build up through the restricted passageway, and means connecting said flapper with said pen arm for actuating said flapper to close the nozzle when said pen arm passes through a position represented by a minimum value of said quantity to be recorded.

7. In a recorder having motor means for moving a chart, a sensitive element responsive to the instantaneous value of a quantity to be recorded, and a pen arm actuated by said sensitive element, means for starting said motor means when said quantity exceeds a minimum value and for stopping said motor means when said quantity is less than said minimum value comprising in combination start and stop means for said motor means, a housing, means providing a fluid inlet port to said housing, means including a nozzle providing a fluid outlet port from said housing, means providing a passageway for fluid between said inlet port and said outlet port, pneumatically operated means including a resilient member responsive to changes within said passageway of fluid pressure, means for operating said start and stop means in response to said pneumatically operated means, a flapper adapted to be actuated to open and close said nozzle whereby the fluid pressure within said passageway can be changed, and means connected to said pen arm to actuate said flapper to close said nozzle when said quantity exceeds a minimum value and thereby increase the fluid pressure within said passageway and to actuate said flapper to open said nozzle when said quantity is less than said minimum value and thereby reduce the fluid pressure within said passageway.

References Cited in the file of this patent

UNITED STATES PATENTS

| Number | Name | Date |
|---|---|---|
| 22,081 | Liernur | Nov. 16, 1858 |
| 829,845 | Corey | Aug. 28, 1906 |
| 1,466,050 | Koski | Aug. 28, 1923 |
| 1,750,336 | Terry | Mar. 11, 1930 |
| 1,922,362 | Halversen | Aug. 15, 1933 |
| 2,181,728 | Greentree | Nov. 28, 1939 |
| 2,461,322 | Hathaway | Feb. 8, 1949 |
| 2,465,990 | Anderson | Apr. 5, 1949 |
| 2,489,997 | Anderson | Nov. 29, 1949 |

FOREIGN PATENTS

| Number | Country | Date |
|---|---|---|
| 97,672 | Switzerland | Feb. 1, 1923 |